United States Patent [19]

Koyama et al.

[11] Patent Number: 5,177,043
[45] Date of Patent: Jan. 5, 1993

[54] α-OLEFIN POLYMERIZATION CATALYST COMPONENT

[75] Inventors: Naomi Koyama; Hiroyuki Furuhashi; Miyuki Usui; Tomoko Okano; Masahide Murata; Satoshi Ueki; Akira Nakano, all of Iruma, Japan

[73] Assignee: Tonen Chemical Corporation, Tokyo, Japan

[21] Appl. No.: 663,850

[22] PCT Filed: Aug. 17, 1990

[86] PCT No.: PCT/JP90/01052
§ 371 Date: Mar. 22, 1991
§ 102(e) Date: Mar. 22, 1991

[87] PCT Pub. No.: WO91/02758
PCT Pub. Date: Mar. 7, 1991

[30] Foreign Application Priority Data

Aug. 18, 1989 [JP] Japan .................. 1-211441
Aug. 18, 1989 [JP] Japan .................. 1-211442

[51] Int. Cl.$^5$ .......................................... C08F 4/656
[52] U.S. Cl. .................................. 502/125; 502/108; 502/112; 502/113; 502/116; 502/120; 502/121; 502/122; 502/123; 502/124; 502/126; 502/127; 526/124; 526/125; 526/128
[58] Field of Search ............... 502/108, 112, 113, 116, 502/120, 121, 122, 123, 124, 125, 126, 127

[56] References Cited

U.S. PATENT DOCUMENTS 4,942,148 7/1990 Furuhashi et al. ............ 502/108 X
4,990,477 2/1991 Kioka et al. .................. 502/125 X Primary Examiner—Patrick P. Garvin
Attorney, Agent, or Firm—R. W. Mulcahy

[57] ABSTRACT

This invention relates to a catalytic component for the polymerization of α-olefins and provides a catalytic component of magnesium support type capable of exhibiting a high stereoregularity while maintaining an improved strength as well as a high catalytic activity. The features thereof consist in a catalyst component for the polymerization of α-olefins obtained by contacting (A) a solid component comprising, as essential components, magnesium, titanium, a halogen and an electron-donating compound with (D) an olefin in the presence of (B) a trialkylaluminum and (C) a dimethoxy group-containing compound represented by the general formula $R^1R^2Si(OCH_3)_2$ where $R^1$ and $R^2$ are, same or different, aliphatic hydrocarbon groups with 1 to 10 carbon atoms and having a volume, calculated by the quantum chemistry calculation, of 230 to 500 Å$^3$ and an electron density of oxygen atoms in the methoxy group, calculated similarly, ranging from 0.685 to 0.800 A. U. (atomic unit) and a catalyst component for the polymerization of α-olefins obtained by contacting (A) a solid component comprising, as essential components, a metal oxide, magnesium, titanium, a halogen and an electron-donating compound with (D) an olefin in the presence of (B) a trialkylaluminum and (C) a dimethoxy group-containing compound represented by the general formula $R^1R^2Si(OCH_3)_2$ where $R^1$ and $R^2$ are, same or different, aliphatic hydrocarbon groups with 1 to 10 carbon atoms and having a volume calculated by the quantum chemistry calculation, of 170 to 500 Å$^3$ and an electron density of oxygen atoms in the methoxy group, calculated similarly, ranging from 0.690 to 0.800 A. U. (atomic unit) or the volume in the range of 200 to 500 Å$^3$ and the electron density in the range of 0.685 to 0.800 A. U.

3 Claims, No Drawings

α-OLEFIN POLYMERIZATION CATALYST COMPONENT

TECHNICAL FIELD OF THE INVENTION

This invention relates to a catalyst for the polymerization of olefins.

TECHNICAL BACKGROUND

A catalyst component for the polymarization of α-olefins, comprising magnesium or a metal oxide and magnesium, titanium, a halogen and an electron-donating compound is known. This catalyst of the metal oxide support type has jointly good polymerization properties such as high activity and high stereoregularity and excellent grain properties whereby polymers are obtained having narrow grain size distributions and uniform grain forms.

When the grain strength of a catalyst component is low, a polymer formed by polymerization is broken to give a fine powder. As a typical method for preventing this phenomenon, there is a so-called previous polymerization method comprising previously contacting the catalyst component with an olefin to take the thus formed polymer in the catalyst and thereby increasing the strength of the catalyst component. It has been proposed to improve the grain strength and increase the stereoregularity of the poly α-olefin by adding an electron-donating compound such as silane compounds during the previous polymerization.

However, the addition of an electron-donating compound during the previous polymerization ordinarily has influences such as lowering of the catalyst activity and deterioration of the properties during storage of the catalyst. As the silane compound to be added during the previous polymerization, there are often used compounds having aromatic groups from the standpoint of the properties, but depending on the object of using the polymer, the silane compounds having aromatic groups are harmful in some cases.

The inventors have made various studies for the purpose of increasing the strength of catalyst grains, improving the stereoregularity of the resulting polymer, maintaining the high activity of the catalyst and preventing the catalyst from deterioration of the property thereof during storage and consequently, have found that when using a dimethoxy silane-containing compound having a volume of 170 to 500Å$^3$, in particular, 230 to 500Å$^3$ and an electron density of oxygen in the methoxy group, ranging from 0.685 to 0.800 A. U., in particular, 0.690 to 0.800 A. U., as a silane compound to be added during previous polymerization, poly α-olefins can be obtained with properties, at least, comparable to those obtained when using organosilicone compounds having aromatic groups, and the object of the present invention can thus be achieved.

DISCLOSURE OF THE INVENTION

That is, the gist of the present invention consists in a catalyst component for the polymerization of α-olefins (hereinafter referred to as first invention) obtained by contacting (A) a solid component comprising, as essential components, magnesium, titanium, a halogen and an electron-donating compound with (D) an olefin in the presence of (B) a trialkylaluminum and (C) a dimethoxy group-containing compound represented by the general formula $R^1R^2Si(OCH_3)_2$ where $R^1$ and $R^2$ are, same or different, aliphatic hydrocarbon groups with 1 to 10 carbon atoms and having a volume, calculated by the quantum chemistry calculation, of 230 to 500Å$^3$ and an electron density of oxygen atoms in the methoxy group, calculated similarly, ranging from 0.685 to 0.800 A. U. (atomic unit) and a catalyst component for the polymerization of α-olefins (hereinafter referred to as second invention) obtained by contacting (A) a solid component comprising, as essential components, a metal oxide, magnesium, titanium, a halogen and an electron-donating compound with (D) an olefin in the presence of (B) a trialkylaluminum and (C) a dimethoxy group-containing compound represented by the general formula $R^1R^2Si(OCH_3)_2$ where $R^1$ and $R^2$ are, same or different, aliphatic hydrocarbon groups with 1 to 10 carbon atoms and having a volume, calculated by the quantum chemistry calculation, of 170 to 500Å$^3$ and an electron density of oxygen atoms in methoxy group, calculated similarly, ranging from 0.690 to 0.800 A. U. (atomic unit) or the volume in the range of 200 to 500Å and the electron density in the range of 0.685 to 0.800 A. U.

SOLID COMPONENT

A solid component (Component A) used in the present invention comprises, as essential components, magnesium or a metal oxide and magnesium, titanium, a halogen and an electron-donating compound, and can ordinarily be prepared by contacting a metal oxide, magnesium compound, titanium compound and electron-donating compound, optionally with a halogen-containing compound in a case where each of these compounds is free from halogens.

(1) Metal Oxides

The metal oxide used in the second invention includes oxides of Group II to IV elements of Periodic Table, for example, $B_2O_3$, MgO, $Al_2O_3$, $SiO_2$, CaO, $TiO_2$, ZnO, $ZrO_2$, $SnO_2$, BaO, $ThO_2$, etc. Above all, $B_2O_3$, MgO, $Al_2O_3$, $SiO_2$, $TiO_2$ and $ZrO_2$ are preferably used and in particular, $SiO_2$ is most preferable. Furthermore, there can be used composite oxides containing these metal oxides can be used, for example, $SiO_2$-MgO, $SiO_2$-$Al_2O_3$, $SiO_2$-$TiO_2$, $SiO_2$-$V_2O_5$, $SiO_2$-$Cr_2O_3$ and $SiO_2$-$TiO_2$-MgO.

These metal oxides can ordinarily be used in the form of powder. Since the size and shape of the powder often affects those of the resulting polymer, it is desired to suitably control them. Preferably, the metal oxides are calcined at a high temperature as more as possible so as to remove harmful materials before use and handled not so as to be in contact with the air.

(2) Magnesium Compounds

The magnesium compound is represented by the general formula $MgR^1R^2$ wherein $R^1$ and $R^2$ are, same or different, hydrocarbon groups, OR groups wherein R is a hydrocarbon group, or halogen atoms. Specifically, the hydrocarbon groups of $R^1$ and $R^2$ include alkyl, cycloalkyl, aryl and aralkyl groups containing 1 to 20 carbon atoms and R of the OR groups include alkyl, cycloalkyl, aryl and aralkyl groups containing 1 to 12 carbon atoms. The halogen atoms are chlorine, bromine, iodine and fluorine.

Examples of these compounds are shown in the following, in which Me: methyl; Et: ethyl; Pr: propyl; Bu: butyl; He: hexyl; Oct: octyl; Ph: phenyl; and cylle: cyclohexyl.

MgMe$_2$, MgEt$_2$, Mgi-Pr$_2$, MgBu$_2$, MgHe$_2$, MgOct$_2$, MgEtBu, MgPh$_2$, MgcyHe$_2$, Mg(OMe)$_2$, Mg(OEt)$_2$, Mg(OBu)$_2$, Mg(OHe)$_2$, Mg(OOct)$_2$, Mg(OPh)$_2$, Mg(OcyHe)$_2$, EtMgCl, BuMgCl, HeMgCl, i-BuMgCl, t-BuMgCl, PhMgCl, PhCH$_2$MgCl, EtMgBr, BuMgBr, PhMgBr, BuMgI, EtOMgCl, BuOMgCl, HeOMgCl, PhOMgCl, EtOMgBr, BuOMgBr, EtOMgI, MgCl$_2$, MgBr$_2$ and MgI$_2$.

The above described magnesium compounds can also be prepared from metallic magnesium or other magnesium compounds when Component A is prepared. For example, there is a method comprising contacting metallic magnesium, a halogenated hydrocarbon and an alkoxy group-containing compound represented by the general formula X$_n$M(OR)$_{m-n}$ in which X is a hydrogen atom, a halogen atom or a hydrocarbon group of 1 to 20 carbon atoms, M is boron, carbon, aluminum, silicon or phosphorus, R is a hydrocarbon of 1 to 20 carbon atoms, m is the atomic valence of M and m > n $\geqq$ 0. The hydrocarbon group of X or R in the general formula of the alkoxy group-containing compound includes alkyl groups such as methyl (Me), ethyl (Et), propyl (Pr), i-propyl (i-Pr), butyl (Bu), i-butyl (i-Bu), hexyl (He), octyl groups (Oct) and the like; cycloalkyl groups such as cyclohexyl (cyHe), methylcyclohexyl groups and the like; alkenyl groups such as allyl, propenyl, butenyl groups and the like; aryl groups such as phenyl, tolyl, xylyl groups and the like; and aralkyl groups such as phenethyl, 3-phenylpropyl groups and the like. Above all, an alkyl groups containing 1 to 10 carbon atoms is preferably used. The alkoxy group-containing compound is exemplified as follows:

① Compound when M is carbon

C(OR)$_4$ such as C(OMe)$_4$, C(OEt)$_4$, C(OPr)$_4$, C(OBu)$_4$, C(Oi-Bu)$_4$, C(OHe)$_4$ and C(OOct)$_4$: XC(OR)$_3$ such as HC(OMe)$_3$, HC(OEt)$_3$, HC(OPr)$_3$, HC(OBu)$_3$, HC(OHe)$_3$, HC(OPh)$_3$, MeC(OMe)$_3$, MeC(OEt)$_3$, EtC(OMe)$_3$, EtC(OEt)$_3$, cyHeC(OEt)$_3$, PhC(OMe)$_3$, PhC(OEt)$_3$, CH$_2$ClC(OEt)$_3$, MeCHBrC(OEt)$_3$, MeCHClC(OEt)$_3$, ClC(OMe)$_3$, ClC(OEt)$_3$, ClC(Oi-Bu)$_3$, and BrC(OEt)$_3$; X$_2$C(OR)$_2$ such as MeCH(OMe)$_2$, MeCH(OEt)$_2$, CH$_2$(OMe)$_2$, CH$_2$(OEt)$_2$, CH$_2$ClCH(OEt)$_2$, CHCl$_2$CH(OEt)$_2$ CCl$_3$CH(OEt)$_2$, CH$_2$BrCH(OEt)$_2$ and PhCH(OEt)$_2$.

② Compound when M is silicon

Si(OR)$_4$ such as Si(OMe)$_4$, Si(OEt)$_4$, Si(OBu)$_4$, Si(Oi-Bu)$_4$, Si(OHe)$_4$, Si(OOct)$_4$ and Si(OPh)$_4$; XSi(OR)$_3$ such as HSi(OEt)$_3$, HSi(OBu)$_3$, HSi(OHe)$_3$ HSi(OPh)$_3$, MeSi(OMe)$_3$, MeSi(OEt)$_3$, MeSi(OBu)$_3$, EtSi(OEt)$_3$, PhSi(OEt)$_3$, EtSi(OPh)$_3$, ClSi(OMe)$_3$, ClSi(OEt)$_3$, ClSi(OBu)$_3$, ClSi(OPh)$_3$, and BrSi(OEt)$_3$; X$_2$Si(OR)$_2$ such as Me$_2$Si(OMe)$_2$, Me$_2$Si(OEt)$_2$, Et$_2$Si(OEt)$_2$, MeClSi(OEt)$_2$, CHCl$_2$SiH(OEt)$_2$, CCl$_3$SiH(OEt)$_2$ and MeBrSi(OEt)$_2$; X$_3$SiOR such as Me$_3$SiOMe, Me$_3$SiOEt, Me$_3$SiOBu, Me$_3$SiOPh, Et$_3$SiOEt and Ph$_3$SiOEt.

③ Compound when M is boron

· B(OR)$_3$ such as B(OEt)$_3$, B(OBu)$_3$, B(OHe)$_3$ and B(OPh)$_3$.

④ Compound when M is aluminum

Al(OR)$_3$ such as Al(OMe)$_3$, Al(OEt)$_3$, Al(OPr)$_3$, Al(Oi-Pr)$_3$, Al(OBu)$_3$, Al(Ot-Bu)$_3$, Al(OHe)$_3$ and Al(OPh)$_3$.

⑤ Compound when M is phosphorus

P(OR)$_3$ such as P(OMe)$_3$, P(OEt)$_3$, P(OBu)$_3$, P(OHe)$_3$ and P(OPh)$_3$.

As the above described magnesium compound, there can be used complexes with organic compounds of Group II or IIIa metals (M) of Periodic Table, which are represented by the general formula MgR$^1$R$^2$·n(MR$^3_m$) wherein M is aluminum, zinc, calcium, etc., R$^3$ is an alkyl group, cycloalkyl group, aryl group or aralkyl group containing 1 to 12 carbon atoms, m is the atomic valence of M and n is a numeral of 0.1 to 10. Examples of the compound represented by MR$^3_m$ are AlMe$_3$, AlEt$_3$, Ali-Bu$_3$, AlPh$_3$, ZnMe$_2$, ZnEt$_2$, ZnBu$_2$, ZnPh$_2$, CaEt$_2$, CaPh$_2$ and the like.

(3) Titanium Compound

The titanium compound includes compounds of di-, tri- and tetravalent titanium, illustrative of which are titanium tetrachloride, titanium tetrabromide, trichoroethoxytitanium, trichlorobutoxytitanium, dichlorodiethoxytitanium, dichlorodibutoxytitanium, dichlorodiphenoxytitanium, chlorotriethoxytitanium, chlorotributoxytitanium, tetrabutoxytitanium, titanium trichloride and the like. Above all, halides of tetravalent titanium such as titanium tetrachloride, trichloroethoxytitanium, dichlorodibutoxytitanium, dichlorodiphenoxytitanium, etc. are preferable and in particular, titanium tetrachloride is most preferable.

(4) Electron-donating Compounds

As the electron donating compound, there are given carboxylic acids, carboxylic acid anhydride, carboxylic acid esters, carboxylic acid halides, alcohols, ethers, ketones, amines, amides, nitriles, aldehydes, alcolates, phosphorus, arsenic and antimony compounds bonded with organic groups through carbon or oxygen, phosphonamides, thioethers, thioesters, carbonic acid esters and the like. Above all, it is preferable to use the carboxylic acids, carboxylic acid anhydrides, carboxylic acid esters, carboxylic acid halides, alcohols, ethers, etc.

Examples of the carboxylic acid are aliphatic monocarboxylic acids such as formic acid, acetic acid, propionic acid, butyric acid, isobutyric acid, valeric acid, caproic acid, pivalic acid, acrylic acid, methacrylic acid, crotonic acid and the like; aliphatic dicarboxylic acids such as malonic acid, succinic acid, glutaric acid, adipic acid, sebacic acid, maleic acid, fumaric acid and the like; aliphatic oxycarboxylic acids such as tartaric acid; alicyclic carboxylic acids such as cyclohexanemonocarboxylic acid, cyclohexenemonocarboxylic acid, cis-1,2-cyclohexanedicarboxylic acid, cis-4-methylcyclohexene-1,2-dicarboxylic acid and the like; aromatic monocarboxylic acids such as benzoic acid, toluic acid, anisic acid, p-t-butylbenzoic acid, naphthoic acid, cinnamic acid and the like; and aromatic polybasic carboxylic acids such as phthalic acid, isophthalic acid, terephthalic acid, napthalic acid, trimellitic acid, hemimellitic acid, trimesic acid, pyromellitic acid, mellitic acid and the like.

As the carboxylic acid anhydride, there can be used the anhydrides of the above described carboxylic acids.

As the carboxylic acid ester, there can be used mono- or polyvalent esters of the above described carboxylic acids, illustrative of which are butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisoutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartarate, dibutyl tartarate, diisobutyl tartarate, ethyl cyclohexanecarboxylate, methyl benzoate, ethyl benzoate, methyl p-toluiate, ethyl p-tert-butylbenzoate, ethyl p-anisate, ethyl α-naphthoate, isobutyl α-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, dibutyl naphthalate, triethyl trimellitate, tributyl trimellitate, tetramethyl pyromellitate, tetraethyl pyromellitate, tetrabutyl pyromellit ate and the like.

As the carboxylic acid halide, there can be used acid halides of the above described carboxylic acids, illustrative of which are acetyl chloride, acetyl bromide, acetyl iodide, propionyl chloride, butyryl chloride, butyryl bromide, butyryl iodide, pivalyl chloride, pivalyl bromide, acrylyl chloride, acrylyl bromide, acrylyl iodide, methacryloyl chloride, methacryloyl bromide, methacrylyl iodide, crotonyl chloride, malonyl chloride, malonyl bromide, succinyl chlride, succinyl bromide, glutaryl chloride, glutaryl bromide, adipyl chloride, adipyl bromide, sebacoyl chloride, sebacoyl bromide, maleoyl chloride, maleoyl bromide, fumaryl chloride, fumaryl bromide, tartaryl chloride, tartaryl bromide, cyclohexancarboxylic chloride, cyclohexanecarboxylic bromide, 1-cyclohexenecarboxylic chloride, cis-4-methylcyclohexenecarboxylic chloride, cis-4-methylcyclohexenecarboxylic bromide, benzoyl chloride, benzoyl bromide, p-toluoyl chloride, p-toluoyl bromide, p-anisoyl chloride, p-anisoyl bromide, α-naphthoyl chloride, cinnamoyl chloride, cinnamoyl bromide, phthaloyl dichloride, phthaloyl dibromide, isophthaloyl dichloride, isophthaloyl dibromide, terephthaloyl dichloride, naphthaloyl dichloride and the like. Monoalkylhalides of dicarboxylic acids can also be used such as adipyl monomethylchloride, maleoyl monoethylchloride, phthaloyl butylchloride can also be used.

Alcohols are represented by the general formula ROH wherein R is an alkyl, alkenyl, cycloalkyl, aryl or aralkyl group containing 1 to 12 carbon atoms. Examples of the alcohol are methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethylphenol, isopropylphenol, p-tert-butylphenol, n-octylphenol and the like.

Ethers are represented by the general formula $ROR^1$ wherein R and $R^1$ are alkyl, alkenyl, cycloalkyl, aryl and aralkyl groups containing 1 to 12 carbon atoms, R and $R^1$ being same or different. Examples of the ethers are diethyl ether, diisopropyl ether, dibutyl ether, diisobutyl ether, diisoamyl ether, di-2-ethylhexyl ether, diallyl ether, ethyl allyl ether, butyl allyl ether, diphenyl ether, anisole, ethyl phenyl ether and the like.

Preparation of Component A is carried out by methods comprising ① contacting a magnesium compound (Component 1), titanium compound (Component 2) and electron-donating compound (Component 3) in this order, ② contacting Components 1 and 3 and then contacting with Component 2, and ③ simultaneously contacting Components 1,2 and 3. Before contacting with Component 2, a halogen-containing compound can be contacted.

Preparation of Component A can also be carried out by other methods comprising ① contacting a metal oxide (Component 1), magnesium compound (Compound 2), titanium compound (Component 3) and electron-donating compound (Component 4) in this order, ② contacting Components 1 and 2 and then contacting with Component 3 and Component 4 in order, ③ contacting Components 1 and 2 and then contacting with Components 3 and 4 simultaneously, ④ contacting Components 2 and 3 and then with Component 4 and Component 1 in this order, ⑤ contacting Components 2 and 4 and then contacting with Component 3 and Component 1 in this order, and ⑥ simultaneously contacting Components 2, 3 and 4 and then contacting with Component 1. Before contacting with Component 3, a halogen-containing compound can be contacted.

As the halogen-containing compound, there can be used halogenated hydrocarbons, halogen-containing alcohols, halogenated silicon compounds having hydrogen-silicon bonds and halides of Group IIa, IVa and Va elements of Periodic Table (which will hereinafter be referred to as metal halides).

As the halogenated hydrocarbon, there can be used mono- and poly-halogen-substitued products of saturated or unsaturated aliphatic, alicyclic and aromatic hydrocarbons containing 1 to 12 carbon atoms. Examples of these compounds are aliphatic compounds such as methyl chloride, methyl bromide, methyll iodide, methylene chloride, methylene bromide, methylene iodide, choroform, bromoform, iodoform, carbon tetrachloride, carbon tetrabromide, carbon tetraiodide, ethyl chloride, ethyl bromide ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, hexabromoethane, n-propyl chloride, 1,2-dichloropropane, hexachloropropylene, octachloropropane, decabromobutane and chlorinated paraffins; alicyclic compounds such as chlorocyclopropane, tetrachlorocyclopentane, hexachlorocyclopentadiene and hexachlorocyclohexane; and aromatic compounds such as chlorobenzene, bromobenzene, o-dichlorobenene, p-dichlorobenzene, hexachlorobenzne, hexabromobenzene, benzotrichloride p-chlorobenzotrichloride and the like. These compounds can be used individually or in combination.

The halogen-containing alcohol used in the present invention means such a compound that in a mono- or polyhydric alcohol having one or more hydroxyl groups in one molecule, any one or more hydrogen atoms other than the hydroxyl groups are substituted by halogen atoms. As the halogen atom, there are chlorine, bromine, iodine and fluorine atoms, but chlorine atom is preferable.

Examples of these compounds are 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propane diol, 2-chlorocyclohexanol, 4-chlorobenzhydrol, (m, o, p)-chlorobenzyl alcohol, 4-chlorocatechol, 4-chloro-(m, o)-cresol, 6-chloro-(m, o)-cresol, 4-chloro-3,5-dimethylphenol, chlorohydroquinone, 2-benzyl-4-chlorophenol, 4-chloro-1-naphthol, (m, o, p)-chlorophenol, p-chloro-α-methyl benzyl alcohol, 2-chloro-4-phenylphenol, 6-chlorothymol, 4-chlororesorcin, 2-bromoethanol, 3-bromo-1-propanol, 1-bromo-2-propanol, 1-bromo-2-butanol, 2-bromo-p-cresol, 1-bromo-2-napthol, 6-bromo-2-naphthol, (m, o, p)-bromophenol, 4-bromoresorcin, (m, o. p)-chlorophenol, p-iodophenol, 2,2-dichloroethanol, 2,3-dichloro-1-propanol, 1,3-dichloro-2-propanol, 3-chloro-1-(α-chloromethyl)-1-propanol, 2,3-dibromo-1-propanol, 1,3-dibromo-2-propanol, 2,4-dibromophenol, 2,4-dibromo-1-naphthol, 2,2,2-trichloroethanol, 1,1,1-trichloro-2-propanol, βββ-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxytoluene, 2,3,5-tribromo-4-hydroxytoluene, 2,2,2-trifluoroethanol, ααα-trifluoro-m-cresol, 2,4,6,-triiodophenol, 2,3,4,6-tetrachlorophenol, tetrachlorohydroquinone, tetrachlorobisphenol A, tetrabromobisphenol A, 2,2,3,3-tetrafluoro-1-propanol, 2,3,5,6-tetrafluorophenol, tetrafluororesorcin and the like.

As the halogenated silicon compound having hydrogen-silicon bonds, there can be used $HSiCl_3$, $H_2SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2C_2H_5SiCl$, $H_2(n-C_4H_9)SiCl$, $H_2(C_6H_4CH_3)SiCl$, $HSiCl(C_6H_5)_2$ and the like.

As the metal halide, there can be used chlorides, fluorides, bromides and iodides of B, Al, Ga, In, Tl, Si, Ge, Sn, Pb, As, Sb and Bi. In particular, $BCl_3$, $BBr_3$, $BI_3$, $AlCl_3$, $AlBr_3$, $GaCl_3$, $GaBr_3$, $InCl_3$, $TlCl_3$, $SiCl_4$, $SnCl_4$, $SbCl_5$, $SbF_5$ and the like are preferable.

Contacting of Components 1, 2 and 3 or Components 1, 2, 3 and 4 optionally with a halogen-containing compound to be contacted is carried out by mixing and stirring or mechanically co-pulverizing in the presence or absence of an inert medium while heating at 40° to 150° C. As the inert medium, there can be used saturated aliphatic hydrocarbons such as hexane, heptane, octane, etc., saturated alicyclic hydrocarbons such as cyclopentane, cyclohexane, etc. and aromatic hydrocarbons such as benzene, toluene, xylene, etc.

Preparation of Component A in the present first invention is preferably carried out by methods disclosed in Japanese Patent Laid-Open Publication Nos. 264607/1988, 198503/1983 and 146904/1987.

That is, ① Japanese Patent Laid-Open Publication No. 264607/1988 discloses a method comprising contacting (a) metallic magnesium, (b) a halogenated hydrocarbon and (c) a compound represented by the general formula $X_n M(OR)_{m-n}$ (same as the foregoing alkoxy group-containing compounds) to obtain a magnesium-containing solid, contacting this solid with (d) a halogen-containing alcohol and then contacting with (e) an electron-donating compound and (f) a titanium compound, ② Japanese Patent Laid-Open Publication No. 146904/1987 discloses a method comprising contacting (a) a magnesium dialkoxide and (b) a halogenated silicon compound having hydogen-silicon bonds, contacting with (c) a halogenated titanium compound and contacting with (d) an electron-donating compound (if necessary, further contacting with the halogenated titanium compound) and ③ Japanese Patent Laid-Open Publication No. 198503/1983 discloses a method comprising contacting (a) a magnesium dialkoxide and (b) a halogenated silicon compound having hydrogen-silicon bonds, then contacting with (c) an electron-donating compound and then contacting with (d) a titanium compound. Above all, the method ① is most preferable.

Preparation of Component A in the present second invention is preferably carried out by methods disclosed in Japanesse Patent Laid-Open Publication Nos. 162607/1983, 94909/1980, 115405/1980, 108107/1982, 21109/1986, 174204/1986, 174205/1986, 174206/1986 and 7706/1987.

① Japanese Patent Laid-Open Publication No. 162607/1983 discloses a method comprising contacting a reaction product of a metal oxide and magnesium dialkoxide with an electron-donating compound and a tetravalent titanium halide, ② Japanese Patent Laid-Open Publication No. 94909/1980 discloses a method contacting a reaction product of a metal oxide and magnesium hydrocarbylhalide with a Lewis base compound and titanium tetrachloride, ③ Japanese Patent Laid-Open Publication Nos. 115405/1980 and 108107/1982 discloses a method comprising contacting an electron-donating compound and a halogenated silicon compound before contacting a titanium compound with a reaction product of a porous support such as silica and a alkylmagnesium compound, ④ Japanese Patent Laid-Open Publication No. 174204/1986 discloses a method comprising contacting a metal oxide, an alkoxy group-containing magnesium compound, an aromatic polybasic carboxylic acid having carboxylic group at the orthoposition or its derivative and a titanium compound, ⑤ Japanese Patent Laid-Open Publication No. 174205/1986 discloses a method comprising contacting a metal oxide, an alkoxy group-containing magnesium compound, a silicon compound having hydrogen-silicon bonds, an electron-donating compound and a titanium compound, ⑥ Japanese Patent Laid-Open Publication No. 174206/1986 discloses a method comprising contacting a metal oxide, alkoxy group-containing magnesium compound, halogen element or halogen-containing compound, electron-donating compound and titanium compound, ⑦ Japanese Patent Laid-Open Publication No. 21109/1986 discloses a method comprising contacting a metal oxide, dihydrocarbylmagnesium and halogen-containing alcohol to obtain a reaction product and then contacting the reaction product with an electron-donating compound and titanium compound and ⑧ Japanese Patent Laid-Open Publication No. 7706/1987 discloses a method comprising contacting a metal oxide, hydrocarbylmagnesium and hydrocarbyloxy group-containing compound (corresponding to the foregoing alkoxy group-containing compound) to obtain a solid and then contacting the solid with a halogen-containing alcohol and further with an electron-donating compound and titanium compound. Above all, the methods ④ to ⑧ are preferable and in particular, the methods ⑦ and ⑧ are most preferable.

Component A is thus prepared, but if necessary, Component A can be washed with an inert medium as described above and dried.

TRIALKYLALUMINUM

Trialkylaluminum (which will hereinafter be referred to as Component B) is represented by the general formula $AlR_3$ wherein R is an alkyl group having 1 to 12 carbon atoms, examples of which are trimethylaluminum, triethylaluminum, tripropylaluminum, triisopropylaluminum, tributylaluminum, triisobutylaluminum, trihexylaluminum, etc.

DIMETHOXY GROUP-CONTAINING SILANE COMPOUND

The dimethoxy group-containing silane compound (which will hereinafter be referred to as Component C) used in the present first invention is represented by the general formula $R^1R^2Si(OCH_3)_2$ and has a molecular volume of 230 to 500Å$^3$ and an electron density of oxygen atoms in the methoxy group of 0.685 to 0.800 A.U. (atomic unit), calculated by the quantum chemistry.

The dimethoxy group-containing silane compound (which will hereinafter be referred to as Component C) used in the present second invention is represented by the general formula $R^1R^2Si(OCH_3)_2$ and has a molecular volume of 170 to 500Å$^3$ and an electron density of oxygen atoms in the methoxy group of 0.690 to 0.800

A.U. (atomic unit), calculated by the quantum chemistry, or has the volume of 200 to 500Å$^3$ and the electron density of 0.685 to 0.800 A.U.

The quantum chemistry calculation is effected as follows:

The molecular volume is obtained by the MNDO method [a kind of semi-empirical molecular orbital method, J.Am.Chem.Soc. 99, page 4899, page 4907 (1977), ibid 100, page 3607 (1978)] of MOPAC as a program of the molecular orbital method [bought from QCPE (Quantum Chemistry Program Organization) as a non-profit-making organization for spreading various programs for chemistry in the Indiana University, USA] and the Van der Waals Radius [J.Phys.Chem. 68, page 441-451 (1964)]. The electron density of oxygen atoms in the methoxy group is calculated by the MNDO method of MOPAC as described above. For this calculation, VAX 11/785 manufactured by DEC (Degital Equipment Corporation) was used.

$R^1$ and $R^2$ in the foregoing general formula for Component C are aliphatic hydrocarbon groups having 1 to 10 carbon atoms, that is, alkyl groups and alkenyl groups, preferably alkyl groups.

Component C in the first invention of the present application has the foregoing molecular volume and electron density of oxygen atoms, preferably a volume of 230 to 350Å$^3$ and an electron density of 0.690 to 0.740 A.U.

For Component C capable of satisfying the foregoing volume and electron density, it is required that the carbon number of $R^1$ and $R^2$ are 3 to 8 and the sum of the carbon number of $R^1$ and $R^2$ is at least 9, preferably that of $R^1$ and $R^2$ being at least 10.

Examples of Component C are given below by chemical formulas:

In the formula, Me: $CH_3$; Et: $C_2H_5$; Pr: $C_3H_7$; Bu: $C_4H_9$; Pt: $C_5H_{11}$; and He: $C_6H_{13}$.

(t-Bu)(t-Pt)Si(OMe)$_2$, (t-Bu)(s-Pt)Si(OMe)$_2$, (t-Pt)$_2$Si(OMe)$_2$, [(n-Pr)(Me)CH]$_2$Si(OMe)$_2$, (t-Pt)(s-Pt)Si(OMe)$_2$, [t-Bu.CH$_2$]$_2$Si(OMe)$_2$, [(Et)(Me)CH.CH$_2$]$_2$Si(OMe)$_2$, (t-Pt)[t-Bu.CH$_2$]$_2$Si(OMe)$_2$. [(n-Pr)(Me)$_2$C](t-Pt)Si(OMe)$_2$, [(Et)(Me)$_2$C.CH$_2$](t-Pt)Si(OMe)$_2$, (n-He)$_2$Si(OMe)$_2$, [(n-Pr)(Me)$_2$C]$_2$Si(OMe)$_2$, [(Et)(Me)$_2$C.CH$_2$]$_2$Si(OMe)$_2$. [t-Bu.C$_2$H$_4$]$_2$Si(OMe)$_2$, ](n-Pr)(Me)$_2$C][(Et)(Me)$_2$C. CH$_2$]Si(OMe)$_2$. etc.

Component C in the present second invention has a volume of 170 to 500Å$^3$ and an electron density of oxygen atoms of 0.690 to 0.800 A.U. or a volume of 200 to 500 Å$^3$ and an electron density of oxygen atoms of 0.685 to 0.800 A.U. and it is preferable to use one having a volume of 200 to 400 Å$^3$ and an electron density of 0.690 to 0.760 A.U., in particular, a volume of 230 to 350 Å$^3$ and an electron density of 0.690 to 0.740 A.U.

For Component C capable of satisfying the foregoing volume and electron density, it is required that the sum of the carbon number of $R^1$ and $R^2$ is at least 5, preferably 7, more preferably 9.

Examples of Component C are given below by chemical formulas:

In the formula, Me: $CH_3$; Et: $C_2H_5$; Pr: $C_3H_7$; Bu: $C_4H_9$; Pt: $C_5H_{11}$; and He: $C_6H_{13}$.

(t-Bu)(Me)Si(OMe)$_2$, (i-Pr)$_2$Si(OMe)$_2$, (t-Bu)(Et)Si(OMe)$_2$, (t-Bu)(i-Pr)Si(OMe)$_2$, (n-He)(Me)Si(Me)$_2$, (t-Bu)(Et)Si(OMe)$_2$, [(n-Pr)(Me)$_2$C](Me)Si(OMe)$_2$, (n-Bu)$_2$Si(OMe)$_2$, (i-Bu)$_2$Si(OMe), (s-Bu)$_2$Si(OMe)$_2$, (t-Bu)$_2$Si(OMe)$_2$, (t-Pt)(i-Pr)Si(OMe)$_2$, [(n-Pr)(Me)$_2$C]Et.-Si(OMe)$_2$, [(Et)$_3$C](Me)Si(OMe)$_2$, (t-Bu)(s-Bu)-Si(OMe)$_2$, (t-Bu)(t-Pt)Si(OMe)$_2$, [(n-Pr)(Me)$_2$C](i-Pr)Si(OMe)$_2$, [(Et)$_3$C](Et) Si(OMe)$_2$, (t-Bu)[(n-Pr)(Me)CH]Si(OMe)$_2$, (t-Pt)$_2$Si(OMe)$_2$, [(n-Pr)(Me)CH]$_2$Si(OMe)$_2$, [(Me)$_3$C.CH$_2$]$_2$Si(OMe)$_2$, [(Et)-(Me)$_2$C.CH$_2$]$_2$Si(OMe)$_2$, (n-He)$_2$Si(OMe)$_2$, [(Me)$_3$C.C$_2$H$_4$]$_2$Si(OMe)$_2$, [(Et)(Me)$_2$C.CH$_2$]$_2$Si(OMe)$_2$, [(n-Pr)(Me)$_2$C]$_2$Si(OMe)$_2$, etc.

PREVIOUS POLYMERIZATION

Previous polymerization of the solid component (Component A) is carried out by contacting with an olefin in the presence of an trialkyl-aluminum compound (Component B) and a dimethoxy group-containing silane compound (Component C).

As the olefin, there can be used, in addition to ethylene, α-olefins such as propylene, 1-butene, 1-hexene, 4-methyl-1-pentene and the like.

The previous polymerization is preferably carried out in the presence of an inert medium as described above. The previous polymerization is generally carried out at a temperature of at most 100° C., preferably −30° C. to +30° C., more preferably −20° C. to +15° C. The polymerization can be carried batchwise or continuously, or in two or more stages. In the case of carrying out the polymerization in multi-stage, the polymerization conditions are of course varied correspondingly.

Component B is generally used in such a manner that the concentration in the previous polymerization system is 50 to 500 millimols/l, preferably 80 to 200 millimols/l and 4 to 50,000 mols, preferably 6 to 1,000 mols per 1 gram atom of titanium.

Component C is generally used in such a manner that the concentration in the previous polymerization is 1 to 100 millimols/l, preferably 5 to 50 millimols/l.

The olefin polymer is taken in Component A by the previous polymerization and the quantity of the polymer is preferably 0.1 to 200 g, in particular, 0.5 to 50 g per 1 g of Component A.

The catalyst component of the present invention, prepared in this way, can be diluted or washed with the foregoing inert medium, but from the standpoint of preventing the catalyst component from deterioration during storage, it should preferably be washed. After washing, it can be dried if necessary. When the catalyst component is stored, the temperature during the same time should preferably be as lower as possible, that is, −50° C. to +30° C., in particular, −20° C. to +5° C.

POLYMERIZATION OF α-OLEFINS

The catalyst component of the present invention, obtained as described above, is useful as a catalyst for the homopolymerization of α-olefins having 3 to 10 carbon atoms or the copolymeriation thereof with other olefins or diolefins having 3 to 10 carbon atoms, in combination with organometal compounds and optionally electron-donating compounds and in particular, it gives very excellent properties as a catalyst for the homopolymerization of α-olefins having 3 to 6 carbon atoms, for example, propylene, 1-butene, 4-methyl-1-pentene, 1-hexene, etc., or for the random or block copolymerization of the above described α-olefins with each other and/or ethylene.

The organometal compound which can be used in the present invention includes organometal compounds of Group I to III metals of Periodic Table, for example, organic compounds of lithium, magnesium, calcium, zinc and aluminum. Above all, organoaluminum compounds are preferable.

As the organoaluminum compound, there are used those represented by the general formula $R_nAlX_{3-n}$ wherein R is an alkyl or aryl group, X is a halogen atom, alkoxy group or hydrogen atom and n is any numeral in the range of $1 \leq n \leq 3$, for example, alkylaluminum compounds containing 1 to 18 carbon atoms, preferably 2 to 6 carbon atoms, such as trialkylaluminum, dialkylaluminum monohalide, monoalkylaluminum dihalide, alkylaluminum sesquihalide and dialkylaluminum monoalkoxide, mixtures or complex compounds thereof. Specifically, there are trialkylaluminums such as trimethylaluminum, trtiethylaluminum, tripropylaluminum, triisobutylaluminum, trihexylluminum, etc., dialkylaluminum monohalides such as dimethylaluminum chloride, diethylaluminum chloride, diethylaluminum bromide, diethylaluminum iodide, diisobutylaluminum chloride, etc., monoalkylaluminum dihalides such as methylaluminum dichloride, ethylaluminum dichloride, methylaluminum dibromide, ethylaluminum dibromie, ethylaluminum diiodide, isobutylaluminum dichloride, etc., alkylaluminum sesquihalide such as ethylaluminum sesquichloride, etc., dialkyl-aluminum monoalkoxide such as dimethylaluminum methoxide, diethylaluminum ethoxide, diethylaluminum phenoxide, dipropylaluminum ethoxide, diisbutylaluminum ethoxide, diisobutylaluminum phenoxide, etc. and dialkylaluminum hydrides such as dimethylaluminum hydride, diethylaluminum hydride, dipropylaluminum hydride, diisobutylaluminum hydride, etc. Above all, trialkylaluminums, particularly, triethylaluminum and triisobutylaluminum are preferable. These trialkylaluminums can be used jointly with other organoaluminum compounds, for example, commercially available diethylaluminum chloride, ethylaluminum dichloride, ethylaluminum sesquichloride, diethylaluminum ethoxide, diethylaluminum hydride or mixtures or complex compounds thereof.

Furthermore, such an organoaluminum compound that two or more aluminums are bonded via oxygen atom or nitrogen atom can be used, illustrative of which are $(C_2H_5)_2AlOAl(C_2H_5)_2$, $(C_4H_9)_2AlOAl(C_4H_9)_2$ and

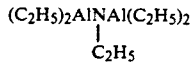

As organic compounds of other metals than aluminum metal, there are diethylmagnesium, ethylmagnesium chloride, diethylzinc and compounds such as $LiAl(C_2H_5)_4$, $LiAl(C_7H_{15})_4$, etc.

As the electron-donating compound which can optionally be combined with the catalyst component and organometal compound according to the present invention, there can be used the foregoing compounds used for the preparation of Component A and the foregoing silane compounds (Component C) used in the previous polymerization. Furthermore, it is also possible to use electron-donating compounds comprising other organosilicon compounds than the foregoing silane compounds and electron-donating compounds containing hetero atoms such as nitrogen, sulfur, oxygen, phosphorus, etc.

Examples of the organosilicon compound are tetramethoxysilane, tetraethoxysilane, tetrabutoxysilane, tetraisobutoxysilane, tetraphenoxysilane, tetra(p-methylphenoxy)silane, tetrabenzyloxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethoxysilane, allyltrimethoxysilane, dimethyldiisopropoxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallyloxysilane, methylphenyldimethoxysilane, chlorophenyldiethoxysilane and the like.

Examples of the electron-donating compound containing hetero atoms are compounds containing nitrogen atoms, such as 2,2,6,6-tetramethylpiperidine, 2,6-dimethylpiperidine, 2,6-diethylpiperidine, 2,6-diisopropylpiperidine, 2,6-diisobutyl-4-methylpiperidine, 1,2,2,6,6-pentamethylpiperidine, 2,2,5,5-tetramethylpyrrolidine, 2,5-dimethylpyrrolidine, 2,5-diethylpyrrolidine, 2,5-diisopropylpyrrolidine, 1,2,2,5,5-pentamethylpyrrolidine, 2,2,5-trimethylpyrrolidine, 2-methylpyridine, 3-methylpyridine, 4-methylpyridine, 2,6-diisopropylpyridine, 2,6-diisobutylpyridine, 1,2,4-trimethylpiperidine, 2,5-dimethylpiperidine, methyl nicotinate, ethyl nicotinate, nicotinamide, benzoic amide, 2-methylpyrrole, 2,5-dimethylpyrrole, imidazole, toluic amide, benzonitrile, acetonitrile, aniline, p-toluidine, o-toluidine, m-toluidine, triethylamine, diethylamine, dibutylamine, tetramethylenediamine, tributylamine and the like, compounds containing sulfur atoms, such as thiophenol, thiophene, ethyl 2-thiophenecarboxylate, ethyl 3-thiophenecarboxylate, 2-methylthiophene, methylmercatan, ethylmercaptan, isopropylmercaptan, butylmercaptan, diethyl thioether, diphenyl thioether, methyl benzenesulfonate, methyl sulfite, ethyl sulfite and the like, compounds containing oxygen atoms, such as tetrahydrofuran, 2-methyltetrahydrofuran 3-methyltetrahydrofuran, 2-ethyltetrahydrofuran, 2,2,5,5-tetraethyltetrahydrofuran, 2,2,5,5-tetraethyltetrahydrofuran, 2,2,6,6-tetraethyltetrahydrofuran, 2,2,6,6-tetrahydropyrane, dioxane, dimethyl ether, diethyl ether, dibutyl ether, diisoamyl ether, diphenyl ether, anisole, acetophenone, acetone, methyl ethyl ketone, acetylacetone, o-tolyl-t-butylketone, methyl-2,6-di-t-butylphenylketone, ethyl 2-furalate, isoamyl 2-furalate, methyl 2-furalate, propyl 2-furalate and the like and compounds containing phosphorus atoms, such as triphenylphosphine, tributylphosphine, triphenyl phsphite, tribenzyl phophite, diethyl phophate, diphenyl phophate and the like.

These electron-donating compounds can be used in combination of two or more. Furthermore, these electron-donating compounds can be used when an organometal compound is used in combination with the catalyst component or after contacted previously with an organometal compound.

The quantity of an organometal compound used for the catalyst component of the present invention is ordinarily 1 to 2,000 gram moles, in particular, 20 to 500 gram moles per 1 gram atom of titanium in the catalyst component.

The ratio of the organometal compound and electron-donating compound is 0.1 to 40, preferably 1 to 25 gram atoms, as aluminum, of the organometal compound to 1 mole of the electron-donating compound.

The polymerization reaction of α-olefins is carried out either in gaseous or liquid phase. In the case of the liquid phase, the polymerization is carried out in an inert hydrocarbon such as n-butane, i-butane, n-pentane, i-pentane, hexane, heptane, octane, cyclohexane, benzene, toluene, or xylene or in a liquid monomer. The polymerization temperature is generally −80° to +150° C., preferably 40° to 120° C. and the polymerization pressure can be, for example, 1 to 60 atm. Control of the molecular weight of the resulting polymer is carried out in the presence of hydrogen or other known molecular weight regulating agents.

In the copolymerization, the amount of other polyolefins to be copolymerized with α-olefin is generally at most 30% by weight, in particular, 0.3 to 15% by weight to the α-olefin. The polymerization reaction is carried out continuously or batchwise under the commonly used conditions. The copolymerization reaction can be carried out either in one or more stages.

EXAMPLES

The present invention will be illustrated specifically by the following examples and application examples, in which percents (%) are to be taken as those by weight unless otherwise indicated.

The heptane-insoluble content (hereinafter referred to as III) showing the proportion of a crystalline polymer in the polymer is a residual amount obtained by extracting the product with boiled n-heptane by means of a Soxhlet extractor of improved tytpe for 6 hours.

EXAMPLE 1

Preparation of Component A 8.3 g of chipped metallic magnesium (purity 99.5%, average grain diameter 1.6 mm) and 250 ml of n-hexane were charged in a reactor of 1000 ml equipped with a refluxing condenser in nitrogen atmosphere and stirred at 68° C. for 1 hour, after which the metallic magnesium was taken out and dried at 65° C. under reduced pressure, thus obtaining metallic magnesium.

To this metallic magnesium were then added 140 ml of n-butyl ether and 0.5 ml of a solution of n-butylmagnesium chloride in n-butyl ether (1.75 mole/l) to prepare a suspension, to which while maintaining at 55° C., a solution of 38.5 ml of n-butyl chloride dissolved in 50 ml of n-butyl ether was dropwise added in 50 minutes. The reaction was carried out while stirring at 70° C. for 4 hours and the reaction solution was maintained at 25° C.

55.7 ml of $HC(OC_2H_5)_3$ was then dropwise added for 1 hour to the reaction solution, after which the reaction was carried out at 60° C. for 15 minutes and the solid reaction product was washed with 300 ml of n-hexane 6 times and dried under reduced pressure for 1 hour at room temperature, thus obtaining 31.6 g of a magnesium-containing solid containing 19.0% of magnesium and 28.9% of chlorine.

6.3 g of the magnesium-containing solid and 50 ml of n-heptane were charged in a nitrogen gas atmosphere in a reactor of 300 ml equipped with a refluxing condenser, stirrer and dropping funnel to prepare a suspension, to which a mixed solution of 20 ml (0.02 millimol) of 2,2,2-trichloroethanol and 11 ml of n-heptane was dropwise added for 30 minutes from the dropping funnel while stirring at room temperature and stirred for 1 hour at 80° C. The thus resulting solid was separated by filtration, washed 4 times with 100 ml of n-hexane at room temperature and further washed 2 times with 100 ml of toluene to obtain a solid component.

To the above described solid component were added 40 ml of toluene and titanium tetrachloride was then added thereto to give a titanium tetrachloride/toluene volume ratio of 3/2, followed by raising the temperature to 90° C. Under stirring, a mixed solution of 2 ml of di-n-butyl phthalate and 5 ml of toluene was dropwise added thereto for 5 minutes and stirred for 2 hours at 120° C. The thus resulting solid material was separated by filtration at 90° C. and washed 2 times with 100 ml of toluene at 90° C. Further, titanium tetrachloride was newly added to give a titanium tetrachloride/toluene volume ratio of 3/2 and stirred at 120° C. for 2 hours. The resulting solid material was separated by filtration at 110° C. and washed 7 times respectively with 100 ml of n-hexane at room temperature to obtain 5.5 g of Component A.

Previous Polymerization 2.5 g of Component A, obtained as above, and 280 ml of n-heptane were charged in a reactor of 500 ml equipped with a stirrer in a nitrogen atmosphere and cooled to −5° C. with agitation. A solution of triethylaluminum (hereinafter referred to as TEAL) in n-heptane (2.0 mols/l) and a solution of di-n-hexyldimethoxysilane in n-heptane (1.0 mol/l) were added thereto in such a manner that the concentrations of TEAL and di-n-hexyldimethoxysilane be respectively 100 millimols/l and 10 millimols/l in the reaction system, followed by stirring for 5 minutes. Then, after the system was evacuated to 400 mmHg, propylene gas was continuously fed to the reaction system and polymerized for 30 minutes. After the polymerization, the propylene gas of gaseous phase was purged with nitrogen gas and the solid phase was washed 3 times with 100 ml of n-hexane at room temperature. Then, the solid phase was dried under reduced pressure at room temperature for 1 hour to prepare a catalyst component. When the quantity of magnesium contained in the catalyst component was measured, the quantity of the previous polymerization was 2.0 per 1 g of Component A.

Furthermore, the volume of the di-n-hexyldimethoxysilane and the electron density of oxygen atoms in methoxy groups were calculated as described above to obtain results shown in Table 1.

EXAMPLES 2 TO 5

A catalyst component was prepared by carrying out the previous polymerization of Component A in an analogous manner to Example 1, except using a silane compound shown in Table 1 instead of the di-n-hexyldimethoxysilane, TEAL or a trialkylaluminum shown in Table 1 instead of TEAL with a concentration shown in Table 1 and previous polymerization ditions shown in Table 1, in the previous polymerization of Example 1.

In Table 1 are shown calculated values as to the volume and the electron density of oxygen atoms in the methoxy groups of each of the silane compounds.

COMPARATIVE EXAMPLE 1

A catalyst component was prepared by carrying out the previous polymerization of Component A in an analogous manner to Example 1, except not using the di-n-hexyldimethoxysilane under the previous polymerization conditions shown in Table 1, in the previous polymerization of Example 1.

COMPARATIVE EXAMPLE 2

A catalyst component was prepared by carrying out the previous polymerization of Component A in an analogous manner to Example 1, except using dimethyldimethoxysilane instead of the di-n-hexyldimethoxysilane and previous polymerization conditions shown in Table 1 in the previous polymerization of Example 1.

COMPARATIVE EXAMPLE 3

A catalyst component (Component A) was prepared by repeating the procedure of Example 1, except not carrying out the previous polymerization.

REFERENCE EXAMPLE 1

A catalyst component was prepared by carrying out the previous polymerization of Component A in an analogous manner to Example 1, except using diphenyldimethoxysilane instead of the di-n-hexyldimethoxysilane and the previous polymerization conditions shown in Table 1.

of 98.4%. The quantity of polypropylene formed ($C_E$) was 47.6 kg per Component A 1 g·1 hour.

The catalyst component obtained in Example 1 was charged in a glass vessel rinsed with nitrogen gas, sealed and stored at 15° C. for 4 days, 10 days and 20 days and then subjected to polymerization of propylene. The polymerization of propylene was carried out in the same manner as described above to obtain results shown in Table 2, from which it is apparent that deterioration after storage is little. In these polymerizations, there was found no fine powder with a grain size of at most 150 µm.

APPLICATION EXAMPLES 2 TO 7

The polymerization of propylene was carried out in an analogous manner to Application Example 1, except using the catalyst components obtained in Examples 2 to 5 instead of the catalyst component obtained in Example 1 and using the electron-donating compounds shown in Table 2 instead of the di-n-hexyldimethoxysilane or not using them, thus obtaining results shown in

TABLE 1

| | Silane Compound | | | | $AlR_3$ | | Previous Polymerization | | | |
|---|---|---|---|---|---|---|---|---|---|---|
| Example | Formula | Volume ($Å^3$) | Electron Density (A.U.) | Concentration (mmol/l) | Name | Concentration (mmol/l) | Temperature (°C.) | Time (min) | Amount of Polymerization (g/g) | After-treatment[2] |
| Example | | | | | | | | | | |
| 1 | $(n-He)_2Si(OMe)_2$ | 290.4 | 0.6941 | 10 | TEAL | 100 | −5 | 30 | 2.0 | wash × 3 times dry |
| 2 | $[(n-Pr)(Me)CH]_2Si(OMe)_2$ | 256.4 | 0.6980 | 8 | TEAL | 80 | 5 | 30 | 4.5 | dil[3] by 5 times |
| 3 | $[(Et)(Me)_2C]_2Si(OMe)_2$ | 256.4 | 0.7223 | 10 | TEAL | 100 | 0 | 30 | 3.2 | wash × 1 time |
| 4 | $[(Me)_3C.CH_2]_2Si(OMe)_2$ | 256.2 | 0.6934 | 10 | TIBAL[1] | 100 | 0 | 90 | 10.2 | dil × 3 times |
| 5 | $[(Et)(Me)_2C.CH_2]_2Si(OMe)_2$ | 290.7 | 0.6900 | 20 | TIBAL | 200 | −5 | 15 | 1.1 | wash × 3 times dry |
| Comparison | | | | | | | | | | |
| 1 | — | — | — | — | TEAL | 100 | 0 | 30 | 3.0 | wash × 1 time |
| 2 | $(Me)_2Si(OMe)_2$ | 120.1 | 0.6802 | 7 | TEAL | 80 | 5 | 30 | 2.1 | dil × 3 times |
| Reference | | | | | | | | | | |
| 1 | $(C_6H_5)_2Si(OMe)_2$ | — | — | 15 | TEAL | 150 | 0 | 30 | 2.9 | wash × 1 time |

Note:
[1] TIBAL: triisobutylaluminum
[2] dil: dilution; wash: washing; dry: drying
[3] diluted with n-heptane

APPLICATION EXAMPLE 1

Polymerization of Propylene 2 ml of a solution containing 0.1 mole of triethylaluminum in 1000 ml of n-heptane, and 2 ml of a solution containing 0.01 mole of di-n-hexyldimethoxysilane in 1000 ml of n-heptane were mixed, held for 5 minutes and charged in a stainless autoclave of 1500 ml, equipped with a stirrer, under nitrogen atmosphere. Then, 600 ml of hydrogen gas as a molecular weight regulator and 1000 ml of liquid propylene were added to the reaction system under pressure and the temperature of the reaction system was raised to 70° C. 40 mg of the catalyst component obtained in Example 1 was introduced into the reaction system and polymerization of propylene was carried out for 1 hour. After the polymerization, the unreacted propylene was purged, thus obtaining a white polypropylene powder having an HI Table 2.

APPLICATION EXAMPLES 8 TO 13

The polymerization of propylene was carried out in an analogous manner to Application Example 1, except using the catalyst components obtained in Comparative Examples 1 to 3 and Reference Example 1 instead of the catalyst component obtained in Example 1 and using the electron-donating compounds shown in Table 3 instead of the di-n-hexyldimethoxysilane and not using them.

TABLE 2

| Application Example | Catalyst Component | Electron-Donating Compound | Storage Temp. (°C.) | Days (day) | $C_E$ (Kg/g · Component A · hour) | HI (%) |
|---|---|---|---|---|---|---|
| 1 | Example (1) | | —* | —* | 47.6 | 98.4 |

TABLE 2-continued

| Application Example | Catalyst Component | Electron-Donating Compound | Storage Temp. (°C.) | Storage Days (day) | $C_E$ (Kg/g · Component A · hour) | HI (%) |
|---|---|---|---|---|---|---|
| | 1 | | 15 | 4 | 48.5 | 98.1 |
| | | | " | 10 | 46.0 | 98.3 |
| | | | " | 20 | 44.5 | 98.1 |
| 2 | Example 2 | (2) | — | — | 48.3 | 98.3 |
| | | | 5 | 4 | 47.1 | 97.9 |
| | | | " | 10 | 44.9 | 98.1 |
| | | | " | 20 | 43.3 | 98.0 |
| 3 | Example 3 | (3) | — | — | 48.4 | 98.4 |
| | | | 0 | 4 | 47.4 | 98.0 |
| | | | " | 10 | 43.6 | 98.0 |
| | | | " | 20 | 45.2 | 98.2 |
| 4 | Example 4 | (4) | — | — | 46.5 | 98.1 |
| | | | 0 | 4 | 45.9 | 98.3 |
| | | | " | 10 | 43.1 | 97.9 |
| | | | " | 20 | 42.7 | 98.2 |
| 5 | Example 5 | (5) | — | — | 49.5 | 98.3 |
| | | | 0 | 4 | 47.0 | 98.0 |
| | | | " | 10 | 45.8 | 98.2 |
| | | | " | 20 | 45.7 | 98.2 |
| 6 | Example 5 | (6) | — | — | 21.8 | 94.5 |
| 7 | Example 4 | — | — | — | 47.9 | 93.2 |

TABLE 3

| Application Example | Catalyst Component | Electron-Donating Compound | Storage Temp. (°C.) | Storage Days (day) | $C_E$ (Kg/g · Component A · hour) | HI (%) |
|---|---|---|---|---|---|---|
| 8 | Comparison Example 1 | (3) | — | — | 47.5 | 92.1 |
| | | | 0 | 20 | 45.8 | 92.6 |
| 9 | Comparison Example 1 | — | — | — | 32.4 | 65.1 |
| 10 | Comparison Example 2 | (7) | — | — | 20.4 | 94.2 |
| | | | 5 | 10 | 19.1 | 94.0 |
| 11 | Comparison Example 2 | (6) | — | — | 16.8 | 86.3 |
| 12 | Comparison Example 3 | (1) | — | — | 26.8** | 91.8 |
| 13 | Reference Example | (8) | — | — | 33.4 | 97.2 |

Note in Tables 2 and 3
*"—" means an experiment immediately after preparation of Catalyst Component.
**2.0% by weight of polymer fine powder of 150 μm or less was formed.
Electron-donating compound (1): (n-He)₂Si(OMe)₂
Electron-donating compound (2): [(n-Pr)(Me)CH]₂Si(OMe)₂
Electron-donating compound (3): [(Et)(Me)₂C]₂Si(OMe)₂
Electron-donating compound (4): [(Me)₃C.CH₂]₂Si(OMe)₂
Electron-donating compound (5): [(Et)(Me)₂C.CH₂]₂Si(OMe)₂
Electron-donating compound (6): (Me)₂Si(OMe)₂
Electron-donating compound (7): [(Pr)(Me)CH]₂Si(OMe)₂
Electron-donating compound (8): [(C₆H₅)₂Si(OMe)₂

EXAMPLE 6

Preparation of Catalyst Component A

A flask of 200 ml, equipped with a dropping funnel and stirrer, was replaced with nitrogen, in which 5 g of silicon oxide (commercial name: G-952, manufactured by DAVISON Co.), calcined in a nitrogen stream at 200° C. for 2 hours and 700° C. for 5 hours, and 40 ml of n-heptane were then charged. Further, 20 ml of a 20% heptane solution (commercial name: MAGALA BEM, manufactured by Texas Alkyls Co.) of n-butylethylmagnesium (hereinafter referred to as BEM) was added thereto and stirred at 90° C. for 1 hour.

The thus obtained suspension was cooled at 0° C, to which a solution of 11.2 g of tetraethoxysilane dissolved in 20 ml of n-heptane was dropwise added for 30 minutes from the dropping funnel. After the dropwise addition, the suspension was heated to 50° C. for 2 hours and stirred at 50° C. for 1 hour. After the reaction, the supernatant was removed by decantation and the resulting solid product was washed with 60 ml of n-heptane at room temperature, followed by removing the supernatant by decantation. This washing treatment with n-heptane was further repeated 4 times.

50 ml of n-heptane was added to the solid to form a suspension, to which a solution of 8.0 g of 2,2,2-trichloroethanol dissolved in 10 ml of n-heptane was dropwise added at 25° C. for 15 minutes from the dropping funnel. After the dropwise addition, the mixture was stirred at 25° C. for 30 minutes. After the reaction, the mixture was washed at room temperature with 60 ml of n-heptane 2 times and with 60 ml of toluene 3 times. Analysis of the resulting solid told that it contained 36.6% of SiO₂, 5.1% of magnesium and 38.5% of chlorine.

To Solid Component I obtained as described above were added 10 ml of n-heptane and 40 ml of titanium tetrachloride, followed by raising the temperature to 90° C., to which a solution of 0.6 g of di-n-butyl phthalate dissolved in 5 ml of n-heptane was added for 5 minutes. Thereafter, the mixture was heated to 115° C. and reacted for 2 hours. The temperature being lowered to 90° C., the supernatant was removed by decantation, followed by washing with 70 ml of n-heptane 2 times. Furthermore, 15 ml of n-heptane and 40 ml of titanium tetrachloride were added to the mixture and reacted at 115° C. for 2 hours. After the reaction, the resulting solid material was washed with 60 ml of n-hexane at room temperature 8 times and then subjected to drying under reduced pressure at room temperature for 1 hour to obtain 8.3 g of a catalytic component (Component A) containing, in addition to 3.1% of titanium, silicon oxide, magnesium, chlorine and di-n-butyl phthalate.

Previous Polymerization 1.9 g of Component A, obtained as above, and 280 ml of n-heptane were charged in a reactor of 500 ml equipped with a stirrer in a nitrogen atmosphere and cooled to 5° C. with agitation. A solution of triethylaluminum (TEAL) in n-heptane (2.0 mols/l) and a solution of di-n-hexyldimethoxysilane in n-heptane (1.0 mol/l) were added thereto in such a manner that the concentrations of TEAL and di-n-hexyldimethoxysilane be respectively 80 millimols/l and 8 millimols/l in the reaction system, followed by stirring for 5 minutes. Then, after the system was evacuated, propylene gas was fed thereto and polymerized for 30 minutes. After the polymerization, the propylene gas of gaseous phase was purged with nitrogen gas and n-heptane at 5° C. was added to the system to dilute by 5 times, thus preparing a slurry of the catalytic component. When a part of the slurry was taken and dried, and the quantity of magnesium contained in the catalyst component was measured, the quantity of the previous polymerization was 3.0 g per 1 g of Component A.

Furthermore, the volume of the di-n-hexyldimethoxysilane and the electron density of oxygen atoms in methoxy groups were calculated as described above to obtain results shown in Table 4.

EXAMPLES 7 TO 11

A catalyst component was prepared by carrying out the previous polymerization of Component A in an analogous manner to Example 6, except using a silane compound shown in Table 4 instead of the di-n-hexyldimethoxysilane, a trialkylaluminum shown in Table 4 with a concentration shown in Table 4 instead of TEAL and previous polymerization conditions shown in Table 4, in the previous polymerization of Example 4.

In Table 4 are shown calculated values as to the volume and the electron density of oxygen atoms in the methoxy groups of each of the silane compounds.

COMPARATIVE EXAMPLE 4

A catalyst component was prepared by carrying out the previous polymerization of Component A in an analogous manner to Example 6, except not using the di-n-hexyldimethoxysilane under the previous polymerization conditions shown in Table 4, in the previous polymerization of Example 6.

COMPARATIVE EXAMPLE 5

A catalyst component was prepared by carrying out the previous polymerization of Component A in an analogous manner to Example 6, except using dimethyldimethoxysilane instead of the di-n-hexyldimethoxysilane and previous polymerization conditions shown in Table 4 in the previous polymerization of Example 6.

COMPARATIVE EXAMPLE 6

A catalyst component (Component A) was prepared by repeating the procedure of Example 6, except not carrying out the previous polymerization.

EXAMPLE 12

Preparation of Catalyst Component A

After silicon oxide and BEM were contacted in an analogous manner to Example 6 except that the stirring time at 90° C. was 2 hours, the supernatant was removed by decantation, the resulting solid product was washed at room temperature with 50 ml of n-heptane and further subjected to removal of the supernatant liquid by decantation. This washing treatment with the n-heptane was carried out 4 times.

20 ml of n-heptane was added to the above described solid to prepare a suspension, to which a solution of 9.6 g of 2,2,2-trichloroethanol dissolved in 10 ml of n-heptane was dropwise added at 0° C. for 30 minutes from the dropping funnel. After stirring at 0° C. for 1 hour, the mixture was heated at 80° C. over 1 hour and the stirring was continued at 80° C. for 1 hour. After the reaction, the mixture was washed with 50 ml of n-heptane 2 times and with 50 ml of toluene 3 times at room temperature to obtain a solid (Solid Component I).

20 ml of toluene and 0.6 g of di-n-butyl phthalate were added to the thus obtained Solid Component I and reacted at 50° C. for 2 hours. Then, 30 ml of titanium terachloride was added thereto and reacted at 50° C. for 2 hours. The resulting solid material was then washed with 50 ml of n-hexane at room temperature 8 times and dried under reduced pressure at room temperature to obtain 7.7 g of Component A containing, in addition to 3.0% of titanium, silicon oxide, magnesium, chlorine, di-n-butyl phthalate.

Previous Polymerization

A catalytic component was prepared by carrying out the previous polymerization in an analogous manner to Example 6 except using Component A obtained as described above and previous polymerization conditions as shown in Table 4.

COMPARATIVE EXAMPLE 7

A catalytic component was prepared in an analogous manner to Example 12 except not using bis(2,2-dimethylpropyl)dimethoxysilane under previous polymerization conditions shown in Table 4.

REFERENCE EXAMPLE 2

A catalytic component was prepared in an analogous manner to Example 12 except using diphenyldimethoxysilane instead of the bis(2,2-dimethylpropyl)dimethoxysilane in the previous polymerization of Example 12 under previous polymerization conditions shown in Table 4.

TABLE 4

| | Silane Compound | | | | AlR$_3$ | | Previous Polymerization | | | |
|---|---|---|---|---|---|---|---|---|---|---|
| Example | Formula | Volume (Å$^3$) | Electron Density (A.U.) | Concentration (mmol/l) | Name | Concentration (mmol/l) | Temperature (°C.) | Time (min) | Amount of Polymerization (g/g) | After-treatment[2] |
| Example | | | | | | | | | | |
| 6 | (n-He)$_2$Si(OMe)$_2$ | 290.4 | 0.6941 | 8 | TEAL | 80 | 5 | 30 | 3.0 | dil × by 5 times |
| 7 | [(Et)(Me)$_2$C]$_2$Si(OMe)$_2$ | 256.4 | 0.7223 | 10 | TEAL | 100 | 0 | 60 | 4.3 | wash × 1 time |
| 8 | (n-Bu)$_2$Si(OMe)$_2$ | 222.1 | 0.6892 | 10 | TEAL | 100 | −5 | 60 | 3.3 | wash[3] × 1 time, dry[4] |
| 9 | (t-Bu)$_2$Si(OMe)$_2$ | 222.4 | 0.7300 | 10 | TIBAL[1] | 100 | 0 | 120 | 7.9 | dil × by 3 times |
| 10 | [(n-Pr)(Me)CH]$_2$Si(OMe)$_2$ | 256.5 | 0.6980 | 20 | TIBAL | 200 | −5 | 30 | 1.7 | wash × 3 times, dry |
| 11 | [(Et)(Me)$_2$C.CH$_2$]$_2$Si(OMe)$_2$ | 290.7 | 0.6900 | 10 | TEAL | 100 | −5 | 60 | 3.3 | wash × 3 times |
| 12 | [(Me)$_3$C.CH$_2$]$_2$Si(OMe)$_2$ | 256.2 | 0.6934 | 10 | TEAL | 100 | 0 | 120 | 1.6 | wash × 3 times, dry |
| Comparison | | | | | | | | | | |
| 4 | — | — | — | — | TEAL | 100 | 0 | 60 | 4.2 | wash × 1 time |
| 5 | (Me)$_2$Si(OMe)$_2$ | 120.1 | 0.6802 | 8 | TEAL | 100 | 5 | 30 | 1.4 | dil × by |

TABLE 4-continued

| Example | Silane Compound Formula | Volume ($Å^3$) | Electron Density (A.U.) | Concentration (mmol/l) | $AlR_3$ Name | Concentration (mmol/l) | Previous Polymerization Temperature (°C.) | Time (min) | Amount of Polymerization (g/g) | After-treatment[2] |
|---|---|---|---|---|---|---|---|---|---|---|
| 6 | — | — | — | — | TEAL | 100 | 0 | 120 | 1.5 | 3 times wash × 3 times, dry |
| Reference 2 | $(C_6H_5)_2Si(OMe)_2$ | — | — | 10 | TEAL | 100 | 0 | 120 | 1.7 | wash × 1 time |

Note:
[1]TIBAL: triisobutylaluminum
[2]dil: dilution; wash: washing; dry: drying
[3]washed with 100 ml of hexane
[4]dried under reduced pressure at room temperature for 1 hr

APPLICATION EXAMPLE 14

Polymerization of Propylene 4 ml of a solution containing 0.1 mole of triethylaluminum in 1000 ml of n-heptane, and 2 ml of a solution containing 0.01 mole of di-t-amyldimethoxysilane in 1000 ml of n-heptane were mixed, held for 5 minutes and charged in a stainless autoclave of 1500 ml, equipped with a stirrer, under nitrogen atmosphere. Then, 1000 ml of hydrogen gas as a molecular weight regulator and 1000 ml of liquid propylene were added to the reaction system under pressure and the temperature of the reaction system was raised to 70° C. 40 mg of the catalyst component obtained in Example 6 was introduced into the reaction system and polymerization of propylene was carried out for 1 hours. After the polymerization, the unreacted propylene was purged, thus obtaining a white polypropylene powder having an III of 97.4%. The quantity of polypropylene formed ($C_E$) was 23.4 kg per Component A 1 g. 1 hour.

The catalyst component obtained in Example 6 was charged in a glass vessel replaced with nitrogen gas, sealed and stored at 5° C. for 4 days 10 days and 20 days and then subjected to polymerization of propylene. The polymerization of propylene was carried out in the same manner as cribed above to obtain results shown in Table 5, from which it is apparent that deterioration after storage is little. In these polymerizations, there was found no fine powder with a grain size of at most 150 μm.

APPLICATION EXAMPLES 15 TO 20

The polymerization of propylene was carried out in an analogous manner to Application Example 14, except using the catalyst components obtained in Examples 7 to 11 instead of the catalyst component obtained in Example 6 and using the electron-donating compounds shown in Table 5 in Application Examples 17 and 20 in-stead of the di-t-amyldimethoxysilane or not using them, thus obtaining results shown in Table 5.

APPLICATION EXAMPLES 21 TO 24

The polymerization of propylene was carried out in an analogous manner to Application Example 14, except using the catalyst components obtained in Comparative Examples 4 to 6 instead of the catalyst component obtained in Example 6 and using the electron-donating compounds shown in Table 6 instead of the di-t-amyldimethoxysilane in Application Example 23, thus obtaining results shown in Table 6.

APPLICATION EXAMPLES 25 TO 27

The polymerization of propylene was carried out in an analogous manner to Application Example 14, except using the catalytic components obtained in Example 12, Comparative Example 7 and Reference Example 2 instead of the catalytic component obtained in Example 6, using triisobutylaluminum instead of TEAL, adjusting the polymerization temperature to 80° C. and using the electron-donating compounds shown in Table 6 instead of the di-t-amyldimethoxysilane or not using the electron-donating compounds, thus obtaining results shown in Table 6.

TABLE 5

| Application Example | Catalyst Component | Electron-Donating Compound | Storage Temp. (°C.) | Storage Days (day) | $C_E$ (Kg/g · Component A · hour) | HI (%) |
|---|---|---|---|---|---|---|
| 14 | Example 6 | (3) | —* | —* | 23.4 | 97.4 |
|  |  |  | 5 | 4 | 23.5 | 97.7 |
|  |  |  | " | 10 | 22.6 | 97.6 |
|  |  |  | " | 20 | 21.8 | 97.7 |
| 15 | Example 7 | (3) | — | — | 23.2 | 97.6 |
|  |  |  | 0 | 4 | 23.6 | 97.3 |
|  |  |  | " | 10 | 22.3 | 98.0 |
|  |  |  | " | 20 | 22.7 | 97.6 |
| 16 | Example 8 | (3) | — | — | 23.7 | 98.1 |
|  |  |  | 23 | 4 | 21.8 | 97.9 |
|  |  |  | " | 10 | 22.3 | 97.8 |
|  |  |  | " | 20 | 22.3 | 98.2 |
| 17 | Example 9 | (9) | — | — | 22.4 | 97.5 |
|  |  |  | 0 | 4 | 21.9 | 97.6 |
|  |  |  | " | 10 | 21.6 | 97.1 |
|  |  |  | " | 20 | 20.8 | 97.8 |
| 18 | Example 10 | (3) | — | — | 24.8 | 97.9 |
|  |  |  | 0 | 4 | 25.1 | 97.8 |
|  |  |  | " | 10 | 24.2 | 97.6 |
|  |  |  | " | 20 | 24.5 | 97.8 |
| 19 | Example 11 | (3) | — | — | 23.7 | 98.1 |
| 20 | Example 7 | (6) | — | — | 13.1 | 94.2 |

TABLE 6

| Application Example | Catalyst Component | Electron-Donating Compound | $C_E$ (Kg/g · Component A · hour) | HI (%) |
|---|---|---|---|---|
| 21 | Comparison Example 4 | (3) | 23.3 | 91.7 |
| 22 | Comparison Example 5 | (3) | 13.1 | 93.0 |
| 23 | Comparison Example 5 | (6) | 9.5 | 87.1 |
| 24 | Comparison Example 6 | (3) | 9.7** | 93.7 |

TABLE 6-continued

| Application Example | Catalyst Component | Electron-Donating Compound | $C_E$ (Kg/g · Component A · hour) | HI (%) |
|---|---|---|---|---|
| 25 | Example 12 | — | 12.1 | 92.8 |
| 26 | Comparison Example 7 | — | 12.8 | 73.0 |
| 27 | Reference Example 2 | (8) | 10.4 | 92.3 |

Note in Tables 5 and 6
*"—" means an experiment immediately after preparation of Catalyst Component.
**1.8% by weight of polymer fine powder of 150 μm or less was formed.
Electron-donating compound (3): [(Et)(Me)$_2$C]$_2$Si(OMe)$_2$
Electron-donating compound (6): (Me)$_2$Si(OMe)$_2$
Electron-donating compound (8): (C$_6$H$_5$)$_2$Si(OMe)$_2$
Electron-donating compound (9): (t-Bu)$_2$Si(OMe)$_2$

UTILITY AND POSSIBILITY

According to the present invention, there can be obtained advantages that the strength of the catalytic component can be increased by the above described features and the catalytic component is capable of maintaining a high activity and exhibiting a high stereoregularity in the (co)polymerization of α-olefins, and in particular, the washed catalytic component is capable of preventing from deterioration during storage.

We claim:

1. In an olefin catalyst component prepared by bringing a solid comprising (a) titanium, (b) magnesium, and (c) an electron-donating compound into contact with (d) an olefin in the presence of (e) an organoaluminum co-catalyst and (f) a silane compound wherein the improvement comprises:

i) the silane compound being a dimethoxy group containing a molecular structure represented by the general formula R$^1$R$^2$Si(OCH$_3$)$_2$ where R$^1$ and R$^2$ are, same or different, aliphatic hydrocarbon groups with 1 to 10 carbon atoms and having a molecular volume of 200 to 500 Å$^3$ and an electron density of oxygen atoms in the methoxy group, calculated similarly, ranging from 0.685 to 0.800 A.U. (atomic units).

2. The catalyst component of claim 1 wherein the silane compound has a molecular volume of from about 230 to 500 Å$^3$.

3. In an olefin catalyst component prepared by bringing a solid comprising (a) titanium, (b) magnesium, and (c) an electron-donating compound into contact with (d) an olefin in the presence of (e) an organoaluminum co-catalyst and (f) a silane compound wherein the improvement comprises:

i) the silane compound being a dimethoxy group containing a molecular structure represented by the general formula R$^1$R$^2$Si(OCH$_3$)$_2$ where R$^1$ and R$^2$ are, same or different, aliphatic hydrocarbon groups with 1 to 10 carbon atoms and having a molecular volume of 170° to 500 Å$^3$ and an electron density of oxygen atoms in the methoxy group, calculated similarly, ranging from 0.690 to 0.800 A.U. (atomic units).

* * * * *